No. 821,651. PATENTED MAY 29, 1906.
J. & P. B. LANDGRAF.
WORK CENTERING DEVICE FOR DRILL PRESSES, LATHES, &c.
APPLICATION FILED MAR. 20, 1905.
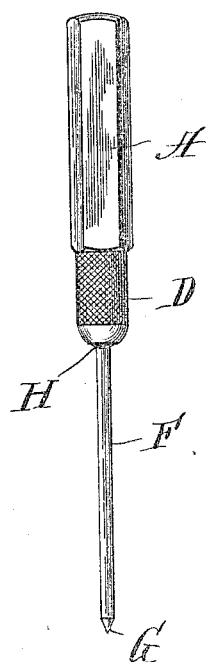
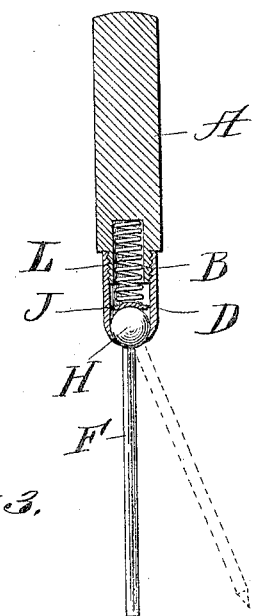
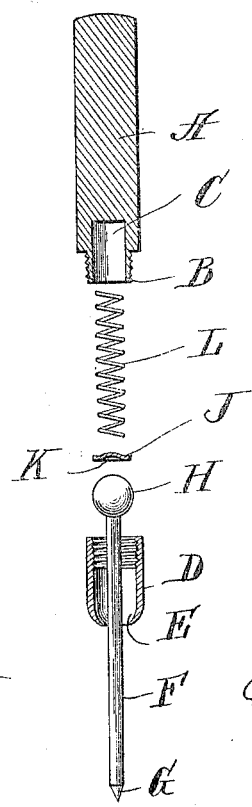
Witnesses:
G A Paubeischmidt
C N Seem
Inventors
Joseph Landgraf
and Philip B. Landgraf
By Brown & Darby
Attys

UNITED STATES PATENT OFFICE.

JOSEPH LANDGRAF AND PHILIP B. LANDGRAF, OF CHICAGO, ILLINOIS; SAID JOSEPH LANDGRAF ASSIGNOR TO SAID PHILIP B. LANDGRAF.

WORK-CENTERING DEVICE FOR DRILL-PRESSES, LATHES, &c.

No. 821,651.  Specification of Letters Patent.  Patented May 29, 1906.

Application filed March 20, 1905. Serial No. 251,029.

*To all whom it may concern:*

Be it known that we, JOSEPH LANDGRAF and PHILIP B. LANDGRAF, citizens of the United States, residing at Chicago, in the county of Cook and State of Illinois, have invented a new and useful Work-Centering Device for Drill-Presses, Lathes, &c., of which the following is a specification.

This invention relates to work-centering devices for drill-presses, lathes, &c.

The object of the invention is to provide an implement which is simple in construction, economical in manufacture, and efficient in operation for indicating the dead-center or point of application of drills in drill-presses and for properly centering the work in lathes and for similar purposes.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference signs appearing thereon, Figure 1 is a view in side elevation of a centering implement embodying the principles of our invention. Fig. 2 is a view in central longitudinal section of the same, a displaced position of the centering indicator or point of the implement being indicated in dotted lines. Fig. 3 is a view indicating in longitudinal section the various parts, somewhat separated from each other, comprising the implement.

The same part is designated by the same reference-sign wherever it occurs throughout the several views.

In the operation of drill-presses and similar machines it frequently becomes necessary to properly center the work in order that the drills may operate thereon at particular points previously indicated upon the work, so that the drill will not only be brought to the proper point for operation on the work, but will be brought into proper alinement to effect its operation, and in the operation of lathes and similar machines it is frequently necessary to properly center the work in the work-holder or "chuck" in order that the tools may properly perform their work. Heretofore it has been a customary plan in centering work for drill-presses and similar machinery to place the work upon the press underneath the drill and then to cause the drill to descend toward the work, while the workholder is shifted and adjusted by hand, or by knocking the same on the side with a hammer or mallet, or in any other way, so as to bring the proper point where the drill is to enter the work into proper position therefor. This operation consumes time and requires exceptional care and precision, which ordinary workmen are not disposed to give to their work, and in centering work in workholders or chucks of lathes or similar machinery the work is clamped in the chuck, and the operator employs a piece of chalk, held in his hand, to indicate whether or not the work is properly centered and effects the adjustment of the work-holder or chuck to secure the proper centering of the work, thereby requiring care and skill and consuming time. It is among the special purposes of our present invention to provide an implement of simple and inexpensive construction whereby the work for drill-presses or similar machinery may be quickly brought to centered position to receive the drill without the exercise of special care or skill and without loss of time and whereby similarly the work in lathes or similar machinery may be quickly centered without requiring the exercise of any unusual care or skill on the part of the operator and without material loss of time.

In the accompanying drawings we have shown an implement wherein these desirable objects are accomplished, and, referring to the accompanying drawings, A designates the handle or chuck portion of the implement, preferably, though not necessarily, of hexagonal shape in cross-section, thereby readily adapting the chuck or handle portion of the implement to be received and clamped in a drill chuck or holder, or the tool post or holder, or other part of the machine in connection with which the implement is to be employed. The chuck portion A is provided at one end thereof with a reduced shoulder B, exteriorly threaded, and also at the same end thereof with a counterbore C.

D designates an interiorly-threaded cap adapted to be screwed upon the threaded shoulder B of the chuck portion. This cap is provided with an opening through the outer end thereof and with a conical seat (indicated at E) surrounding such opening.

F designates the point or tool portion of the implement, preferably, though not necessarily, pointed at one end, as indicated at G, and provided or formed with a ball H at its opposite end. This point or tool F is passed longitudinally through the cap D, and the ball H is seated in the conical seat E in the end of cap D, as clearly shown in Fig. 2.

J designates a friction-plate having a concave-seat portion K to receive and to conform to the shape of the ball H on the inner end of the tool F, this friction-plate and its concave seat K coöperating with the concave seat E of the cap D to form a ball-bearing, in which the ball H of the device is received within the cap D.

L designates a spring designed to be received within the counterbore C of the chuck or handle portion A and to bear upon the friction-plate J to maintain the same with a yielding bearing against the surface of the ball H, as clearly shown in Fig. 2. The tension of spring L when the implement is assembled is exerted upon the ball H to press the point F outwardly with a yielding pressure, permitting the point F and the ball H thereon to yield against endwise pressure.

The manner of use of the implement will be readily understood from the foregoing description. Where it is desired to center the work for drill-presses, for instance, the chuck A is clamped in the drill-press, and the press is operated by hand or otherwise, so as to move the chuck-head of the press downwardly toward the work. The end G of the point F is placed on the marked point where the drill is to operate and the implement is rotated. If the work is not in proper centered position, the point F of the implement will oscillate or wabble by reason of the bearing of the end G thereof on the work and the ball-and-socket bearing of the point F in the handle part of the device permitting the wabbling movement. The work is then shifted in suitable direction until there is no lateral or wabbling movement of the point F of the implement. The work is then in centered position and is clamped in such position, the implement removed from the chuck-head, and the boring tool or drill inserted therein. The boring operation now proceeds with absolute certainty that the work is properly centered therefor. Where it is desired to use the implement to center the work in a lathe the handle or chuck part A of the implement is clamped in the tool post or holder, while the work to be operated upon is clamped in the chuck of the lathe-head. By advancing the tool-post till the end G of the implement contacts with the work and imparting rotation to the lathe head or chuck, by hand or otherwise, the work may be readily centered by observing whether or not there is deflection of the point F of the implement and the extent thereof, the point or needle F of the implement remaining in its deflected position by the spring-pressure exerted thereon. The provision of the spring L serves, therefore, not only to hold the point F in deflected position, but also permits the needle or point F of the implement to yield endwise against any endwise pressure exerted thereon.

It is obvious that an implement embodying the principles of our invention may be employed for many other uses and purposes in connection with the centering of work and other uses. We do not desire, therefore, to be limited in respect to the use to which the implement is to be put.

Having now set forth the object and nature of our invention and a construction embodying the principles thereof, what we claim as new and useful and of our own invention, and desire to secure by Letters Patent, is—

1. In an implement of the character described, the combination of a chuck or handle portion adapted to be clamped in a chuck or other support, a needle or point, means giving the needle or point universal-joint connection with said handle; said needle or point being movable laterally and longitudinally, and means for yieldingly holding the needle against both of said movements.

2. In an implement of the character described, a chuck or handle portion, a cap connected therewith and having a ball-bearing formed therein, a point or needle having a ball on the end thereof, said ball adapted to be seated in said bearing, and a spring arranged to bear upon said ball.

3. In an implement of the character described, a chuck or handle portion and having a counterbore in the end thereof, a cap adapted to be received upon the end of said handle portion and formed with a ball-bearing, a point or needle having a ball on the end thereof arranged to be received in said bearing, and a spring arranged to be received in said counterbore and bearing upon said ball.

4. An implement of the character described, comprising a chuck or handle portion having a reduced exteriorly-threaded shoulder and a counterbore at one end thereof, an open-ended cap adapted to be received upon said threaded shoulder, a point or needle having a ball on the end thereof, said ball being inclosed and seated within said cap, a friction-plate bearing upon said ball, and a spring seated in said counterbore and bearing upon said friction-plate.

5. An implement of the character described, comprising a chuck or handle portion having a reduced exteriorly-threaded shoulder and a counterbore at one end, an open-ended cap adapted to be screwed upon said threaded shoulder and inclosing the counterbore, said cap having a circular bearing-seat surrounding the opening at the free end thereof, a tool point or needle having its shank extending through the open free end of said cap and provided with a ball on the inner end thereof, said ball being received in said seat, a friction-plate arranged within said cap and bearing upon said ball to retain the same in its seat, and a spring seated in said counterbore and bearing against said friction-plate In witness whereof we have hereunto set our hands, this 16th day of March, 1905, in the presence of the subscribing witnesses.

JOSEPH LANDGRAF.
PHILIP B. LANDGRAF.

Witnesses:
C. H. SEEM,
S. E. DARBY.